United States Patent [19]

Hiramatsu et al.

[11] Patent Number: 4,791,568
[45] Date of Patent: Dec. 13, 1988

[54] METHOD OF CONTROLLING HYDRAULIC PRESSURE FOR AN AUTOMATIC TRANSMISSION GEAR SYSTEM

[75] Inventors: Takeo Hiramatsu; Bonnosuke Takamiya; Yuichi Tanaka, all of Kyoto, Japan

[73] Assignee: Mitsubishi Jidosha Kogyo Kabushiki Kaisha, Japan

[21] Appl. No.: 780,402

[22] Filed: Sep. 26, 1985

[30] Foreign Application Priority Data

Sep. 29, 1984 [JP] Japan ................................ 59-204491

[51] Int. Cl.$^4$ ........................ B60K 41/08; F16H 5/40; G05D 16/00
[52] U.S. Cl. .................................... 364/424.1; 74/866; 74/867; 74/869
[58] Field of Search ................... 364/424.1; 74/752 B, 74/752 D, 865, 866, 867, 869

[56] References Cited

U.S. PATENT DOCUMENTS

| | | | |
|---|---|---|---|
| 4,488,456 | 12/1984 | Taga et al. | 74/867 |
| 4,502,354 | 3/1985 | Suzuki et al. | 74/867 |
| 4,506,563 | 3/1985 | Hiramatsu | 74/867 |
| 4,513,639 | 4/1985 | Hiramatsu | 74/866 |
| 4,519,273 | 5/1985 | Shimizu et al. | 74/867 |
| 4,563,918 | 1/1986 | Sugano | 74/869 |

Primary Examiner—Felix D. Gruber
Attorney, Agent, or Firm—Jordan B. Bierman

[57] ABSTRACT

In an automatic transmission for a vehicle in which frictional engaging elements are selectively actuated by application of a hydraulic pressure for stopping the rotation of a selected one of rotary elements relative to the others thereby changing over the speed ratio, and the hydraulic pressure is subjected to feedback control so that an actual changing rate of the rotation speed of the rotary element can follow up a predetermined reference rate for attaining an ideal speed shift, an initial hydraulic pressure to be supplied to a specific frictional engaging element in the starting stage of a succeeding speed shift is decided on the basis of the detected value of the hydraulic pressure supplied to the specific frictional engaging element in a preceding speed shift. Thus, even when the capacity of the automatic transmission does not primarily match that of an engine combined therewith, the initial hydraulic pressure supplied to the frictional engaging element can be quickly converged to an appropriate value with high accuracy, and the automatic transmission can be satisfactorily combined with any one of engines having different capacities.

6 Claims, 9 Drawing Sheets

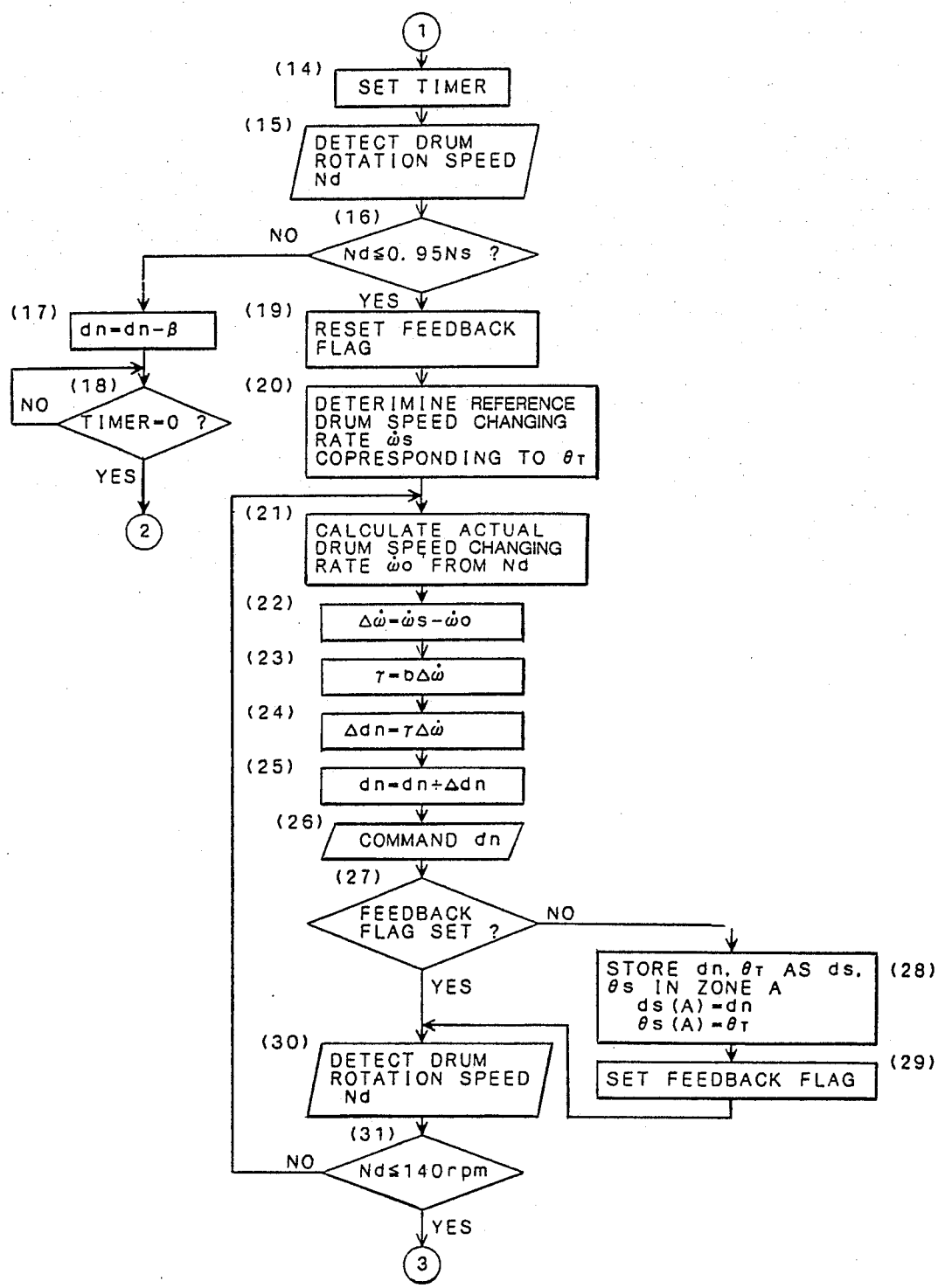

METHOD OF CONTROLLING HYDRAULIC PRESSURE FOR AN AUTOMATIC TRANSMISSION GEAR SYSTEM

BACKGROUND OF THE INVENTION

This invention relates to an automatic transmission for an automotive vehicle having a feedback control function for supplying an adequate hydraulic pressure to frictional engaging elements of the automatic transmission during a shift from one speed ratio to another. More particularly, the present invention relates to a method of automatically correcting the initial hydraulic pressure to set it at a suitable value to be supplied to the frictional engaging elements of the automatic transmission even when the engine of the vehicle is replaced by another of different capacity such as an output torque or displacement different from that of the former.

In general, it is the function of an automatic transmission for an automotive vehicle that frictional engaging elements such as clutches and brakes are selectively actuated by application of a hydraulic pressure for stopping the rotation of a selected one of rotary elements relative to others in its gear system or connecting or disconnecting the rotary element with or from an input shaft, thereby automatically changing over or shifting the speed ratio depending on the operating condition of the vehicle. In order to protect the parts of the automatic transmission against damage or to ensure comfortable ride of occupants of the vehicle, the hydraulic pressure supplied to the frictional engaging elements of the automatic transmission is controlled gradually along a predetermined characteristic curve from the value of the initial hydraulic pressure supplied immediately after a shift to another speed ratio has started.

Nowaday, a variety of kinds of vehicles are sold on the market to meet a variety of needs, and a variety of kinds of engines are furnished to be mounted on such vehicles. However, due to the fact that the initial hydraulic pressure described above differs depending on the factor such as the displacement and/or output torque of engines mounted on vehicles, a variety of kinds of automatic transmissions must also be prepared to meet the variety of kinds of the engines. Suppose, for example, the case in which an automatic transmission adapted to be combined with an engine having a relatively large displacement is combined with an engine having a relatively small displacement. In such a case, since the operating hydraulic pressure (line pressure) of the automatic transmission adapted to be combined with a large-displacement engine is primarily high compared with that of the automatic transmission adapted to be combined with the small-displacement engine, the engaging force of the frictional engaging elements will become excessively large compared with the output torque of the engine, and the frictional engaging elements will be engaged by the initial hydraulic pressure as soon as a shift starting signal is generated, resulting in impartation of a great shift shock. In a converse case, on the other hand, the line pressure will be too low to start a speed shift or a large length of time will be required to attain the speed shift. Thus, it has been impossible to apply an automatic transmission of single capacity to an engine other than those of predetermined capacity.

Therefore, automatic transmission of a small number had to be manufactured for each of a variety of kinds, resulting in increased production costs and troublesome production control.

SUMMARY OF THE INVENTION

With a view to improve such a prior art situation, it is a primary object of the present invention to provide, in connection with an automatic transmission having a feedback control function so as to supply an appropriate hydraulic pressure to frictional engaging elements during a shift from one speed ratio to another, a method of setting the initial hydraulic pressure to meet any one of a variety of kinds of engines, thereby realizing the desired application of the automatic transmission of single capacity, to any one of engines of various capacities, while, at the same time, reducing the production costs and simplifying the production control.

Another object of the present invention is to provide a method which can adjust the initial hydraulic pressure to a value ideal for each of various engines with high accuracy.

In accordance with the present invention which attains the above object, there is provided a method of controlling hydraulic pressure for an automatic transmission gear system having, an input shaft coupled to an internal combustion engine, an output shaft coupled to driving wheels, a speed change gear assembly connecting said input shaft and said output shaft and adapted to be coupled to provide various speed ratios between the rotation of the input shaft and that of the output shaft, plural frictional engaging elements for effecting changes in the speed ratios, detecting means which detects the rotation speed of a rotatable element that changes its rotation speed during a shift from one speed ratio to another, and a control device which carries out feedback control of hydraulic pressure supplied to a specific one of said plural frictional engaging elements to be engaged so as to converge the changing rate of the rotation speed of said rotatable element to a predetermined reference rate during the shift, wherein a value of initial hydraulic pressure to be supplied, immediately after start of a next shift, to said specific frictional engaging element is decided from a value of initial feedback-controlled hydraulic pressure supplied to said specific frictional engaging element in an initial stage of said feedback control of current shift.

BRIEF DESCRIPTION OF THE DRAWINGS

FIG. 2-1 and 2-2 taken together show diagrammatically the structure of the hydraulic pressure control part of the automatic transmission shown in FIG. 1.

FIGS. 3(a)-1 and 3(a)-2 together are a flow chart of an embodiment of the method according to the present invention.

FIGS. 3(b)-1 and 3(b)-2 together are a flow chart showing a partial modification of the flow chart showing in FIG. 3(a)-1, 3(a)-2.

DESCRIPTION OF THE PREFERRED EMBODIMENTS

Preferred embodiments of the present invention will now be described with reference to the drawings.

Before describing the present invention in detail, an example of an automatic transmission to which the present invention is applied will be described with reference to FIG. 1 which shows schematically the structure of such an automatic transmission.

It is supposed herein that an automatic transmission adapted to be combined with a large-displacement engine is combined with a small-displacement engine so as to illustrate clearly the effect of the method according to the present invention.

Figure 1:
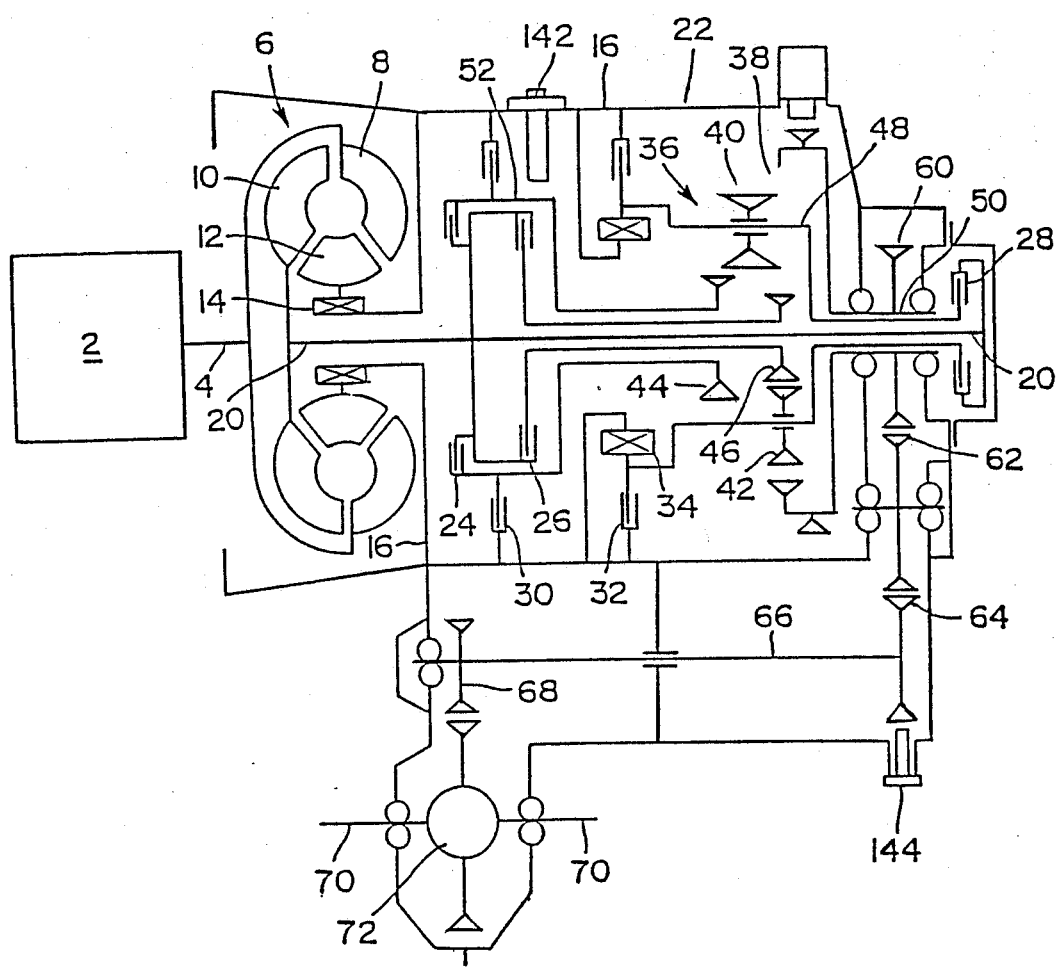
FIG. 1 shows schematically the structure of the power transmitting part of an automatic transmission to which the present invention is applied.

Referring now to FIG. 1, the engine 2 providing a power source for driving a vehicle is directly coupled at its crankshaft 4 to a pump 8 of a torque converter 6. The torque converter 6 includes the pump 8, a turbine 10, a stator 12 and a one-way clutch 14. The stator 12 is coupled to a casing 16 through the one-way clutch 14. The stator 12 is so arranged that it can rotate in the same direction as the crankshaft 4 but is not permitted to rotate in the reverse direction by the function of the one-way clutch 14.

The torque transmitted to the turbine 10 is then transmitted by an input shaft 20 to a speed change gear assembly 22 which is disposed behind the torque converter 6 and which provides four forward speeds and one reverse speed.

The speed change gear assembly 22 includes three clutches 24, 26, 28, two brakes 30, 32, one one-way clutch 34, and one ravigneaux type planetary gear set 36. The planetary gear set 36 includes a ring gear 38, a long pinion gear 40, a short pinion gear 42, a front sun gear 44, a rear sun gear 46, and a carrier 48. The carrier 48 rotatably supports the two pinion gears 40 and 42 and is also rotatable around its own axis. The ring gear 38 is coupled to an output shaft 50, and the front sun gear 44 is coupled to the input shaft 20 through a kickdown drum 52 and the front clutch 24. The rear sun gear 46 is coupled to the input shaft 20 through the rear clutch 26. The carrier 48 is fixedly coupled to the casing 16 through the low reverse brake 32 and the one-way clutch 34 which are arranged to be functionally parallel to each other. The carrier 48 is also coupled to the input shaft 20 through the 4th speed clutch 28 disposed in the rear end of the speed change gear assembly 22. The kickdown drum 52 can be fixedly coupled to the casing 16 by the kickdown brake 30. The torque transmitted through the planetary gear set 36 is transmitted from an output gear 60 fixed to the output shaft 50 to a driven gear 64 via an idle gear 62, and, thence, transmitted via a transfer shaft 66 to which the driven gear 64 is fixed and via a helical gear 68 to a differential gear unit 72 to which a driving shaft 70 driving the driving wheel is coupled.

Figures 1, 2:
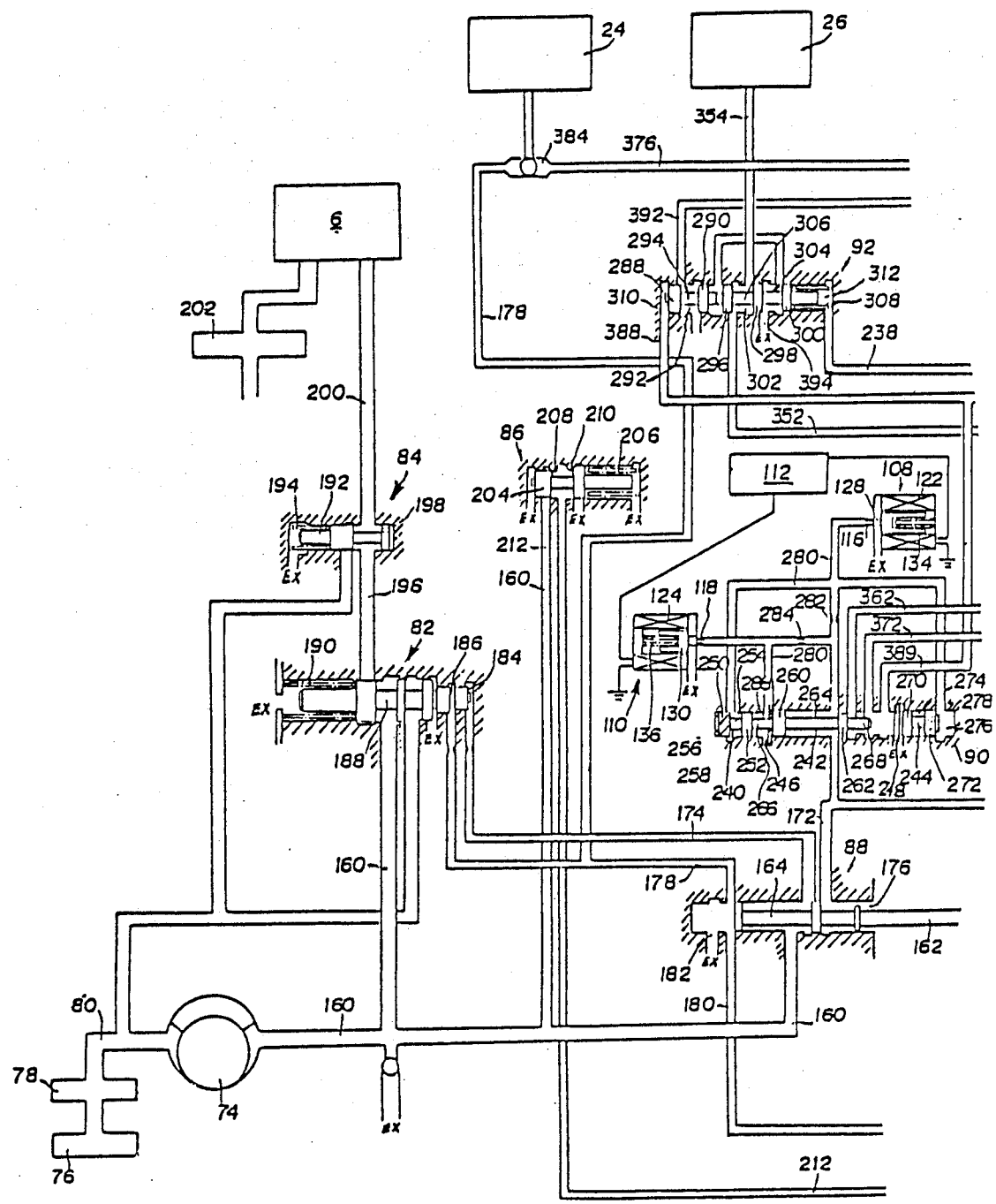
Figure 2:
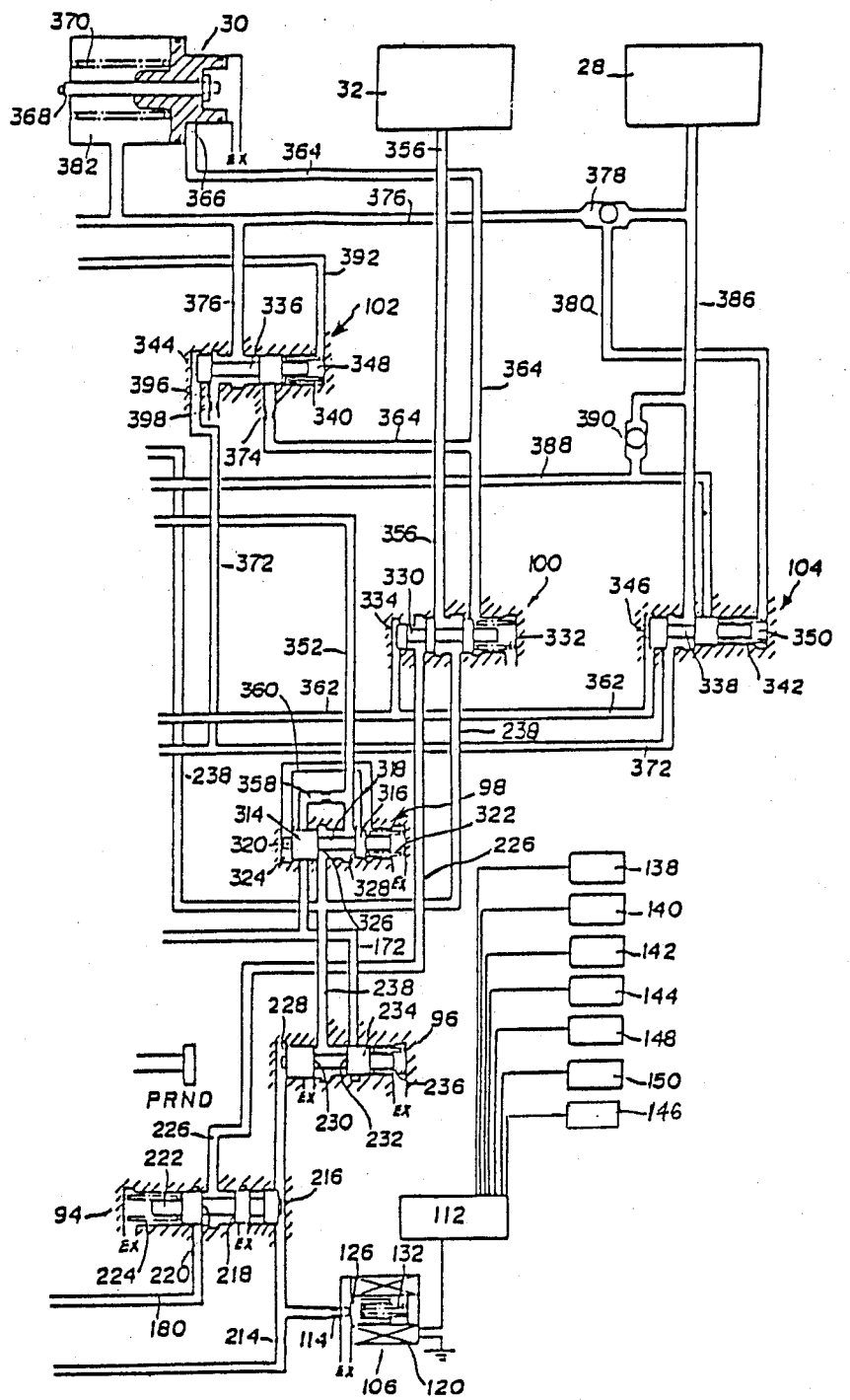

The frictional engaging elements or the individual clutches and brakes described above are in the form of frictional engaging devices including engaging piston units, servo units or the like respectively and are actuated by a hydraulic pressure generated at an oil pump 74 which is shown in FIG. 2. This oil pump 74 is driven from the engine 2 through the pump 8 of the torque converter 6. The hydraulic pressure is selectively supplied, under control of a hydraulic pressure control system, described later, to the individual clutches and brakes depending on the driving condition of the vehicle detected by various driving condition detectors or sensors, so that combinations of the operations of the individual clutches and brakes achieve speed ratios of four forward speeds and reverse speed shown in Table 1. In the table, the symbol ● indicates that the corresponding clutch or brake is engaged, while the symbol ● indicates that the rotation of the carrier 48 is locked by the function of the one-way clutch 34 immediately before the low reverse brake 32 is engaged for shifting operation.

TABLE 1

| Frictional engaging element | Speed | | | | | |
|---|---|---|---|---|---|---|
| | 1st | 2nd | 3rd | 4th | R | N,P |
| Front clutch 24 | | | α | | α | |
| Rear clutch 26 | α | α | α | | | |
| Kickdown brake 30 | | α | | α | | |
| Low reverse brake 32 | α | | | | α | |
| One-way clutch 34 | ● | | | | | |
| 4th speed clutch 28 | | | | α | | |

The hydraulic pressure control system provided for achieving the speed ratios shown in table 1 in the speed change gear assembly 22 shown in FIG. 1 will now be described.

The hydraulic pressure pumped out from an oil sump 76 and discharged from the oil pump 74 flows through an oil filter 78 and a fluid passage 80 to be supplied to the torque converter 6 and to individual fluid chambers of the piston units or servo units of the clutches 24, 26, 28 and brakes 30, 32 of the speed change gear assembly 22. The hydraulic pressure control system shown in FIG. 2 controls the hydraulic pressure supplied to the fluid chambers depending on the driving condition of the vehicle. The hydraulic pressure control system includes, as its principal components, a pressure regulating valve 82, a torque converter control valve 84, a pressure reducing valve 86, a manual valve 88, a shift control valve 90, a rear clutch control valve 92, an N-R control valve 94, a hydraulic pressure control valve 96 for speed shifting, an N-D control valve 98, a 1st-2nd speed shift valve 100, a 2nd-3rd speed and 4th-3rd speed shift valve 102, a 4th clutch control valve 104, and three electromagnetic valve 106, 108, and 110. These components are connected to one another by fluid passages. The shift control valve 90, the 1st-2nd speed shift valve 100, the 2nd-3rd and 4th-3rd speed shift valve 102 and the 4th clutch control valve 104 function as change-over valves changing over the fluid passages leading to the individual frictional engaging elements 24, 26, 28, 30 and 32 among these components thereby changing over the speed ratios. The hydraulic pressure control valve 96, the N-R control valve 94 and the electromagnetic valve 106 controlling the hydraulic pressure supplied to the individual frictional engaging elements are controlled by an electronic control device 112.

The electromagnetic valves 106, 108, and 110 have the same structure and are of the type closed when de-energized, for effecting open-close control of associated orifices 114, 116 and 118 in response to an electrical signal applied from the electronic control device 112. The electromagnetic valves 106, 108 and 110 include coils 120, 122, 124, valve members 126, 128, 130 disposed in the coils for opening and closing the orifices 114, 116, 118 and springs 132, 134, 136 normally urging the valve members in the closing direction, respectively.

The electronic control device 112 contains units such as a driving condition determination units detecting the driving condition of the vehicle and determining the open-close combination of the electromagnetic valves 108, 110 and a shift detection unit detecting starting of a speed shift. Said device 112 controls on-off of the duty-controlled electromagnetic valve 106 and also the hydraulic pressure by controlling the valve open period in one cycle by varying the single pulse width of the pulse current of 50 Hz supplied to the electromagnetic valve 106. Said device 112 controls the opening/closing of the electromagnetic valves 108 and 110. Input elements applying inputs to the electronic control device 112 include an engine load sensor 138 detecting the opening of the throttle valve (not shown) of the engine 2, a rotation speed sensor 140 detecting the rotation speed of the engine 2, another rotation speed sensor 142 detecting the rotation speed of the kickdown drum 52 shown in FIG. 1, another rotation speed sensor 144 detecting the rotation speed of the driven gear 64 thereby detecting the rotation speed of the output shaft 50 corresponding to the vehicle speed, an oil temperature sensor 146 detecting the temperature of lubricating oil, a position sensor 148 detecting the selected position of the selector lever, and another position sensor 150 detecting the selected position of an auxiliary switch provided for selection of the forward shift range.

Figures 1, 3A:
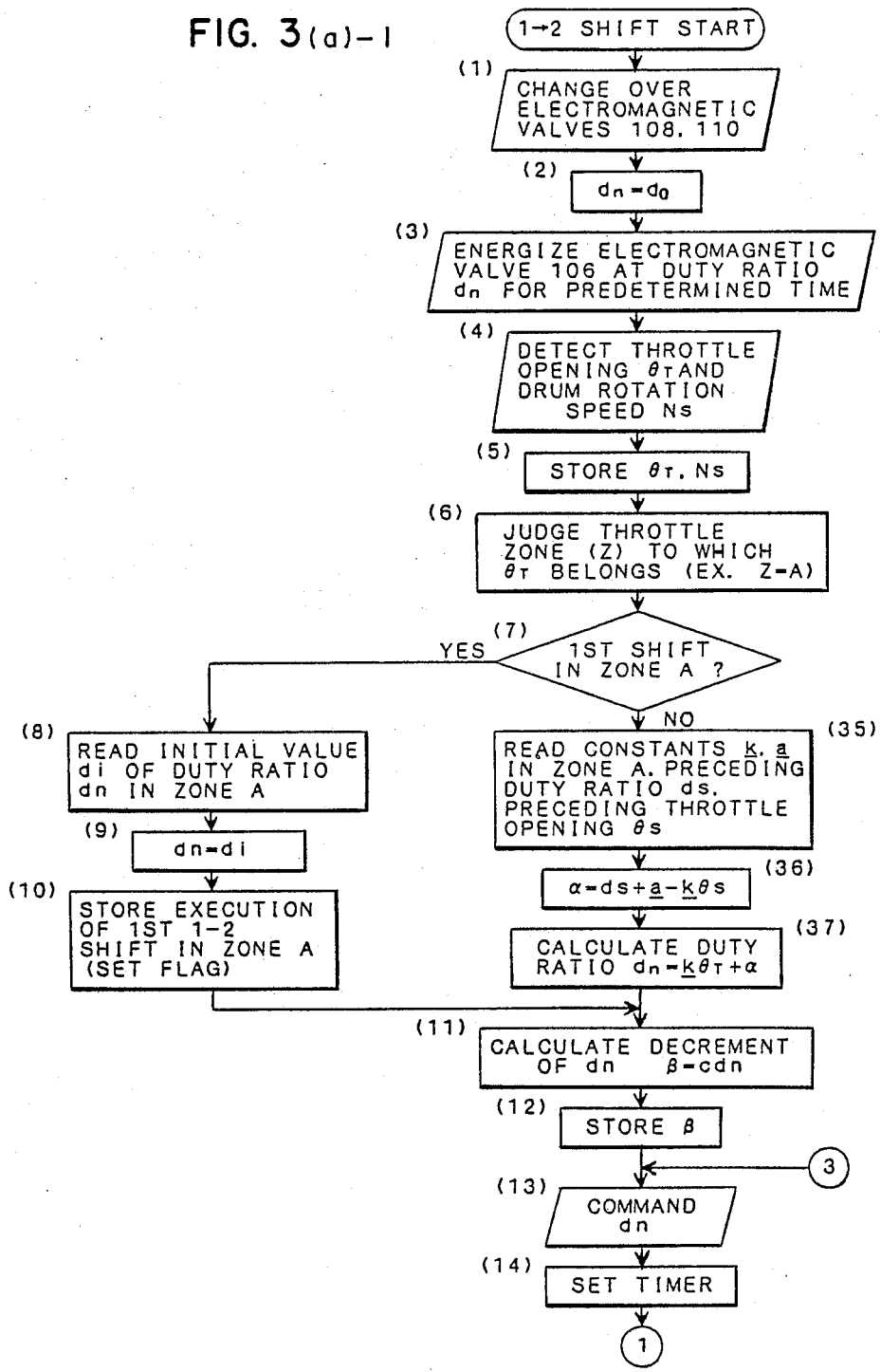
Figures 2, 3A:
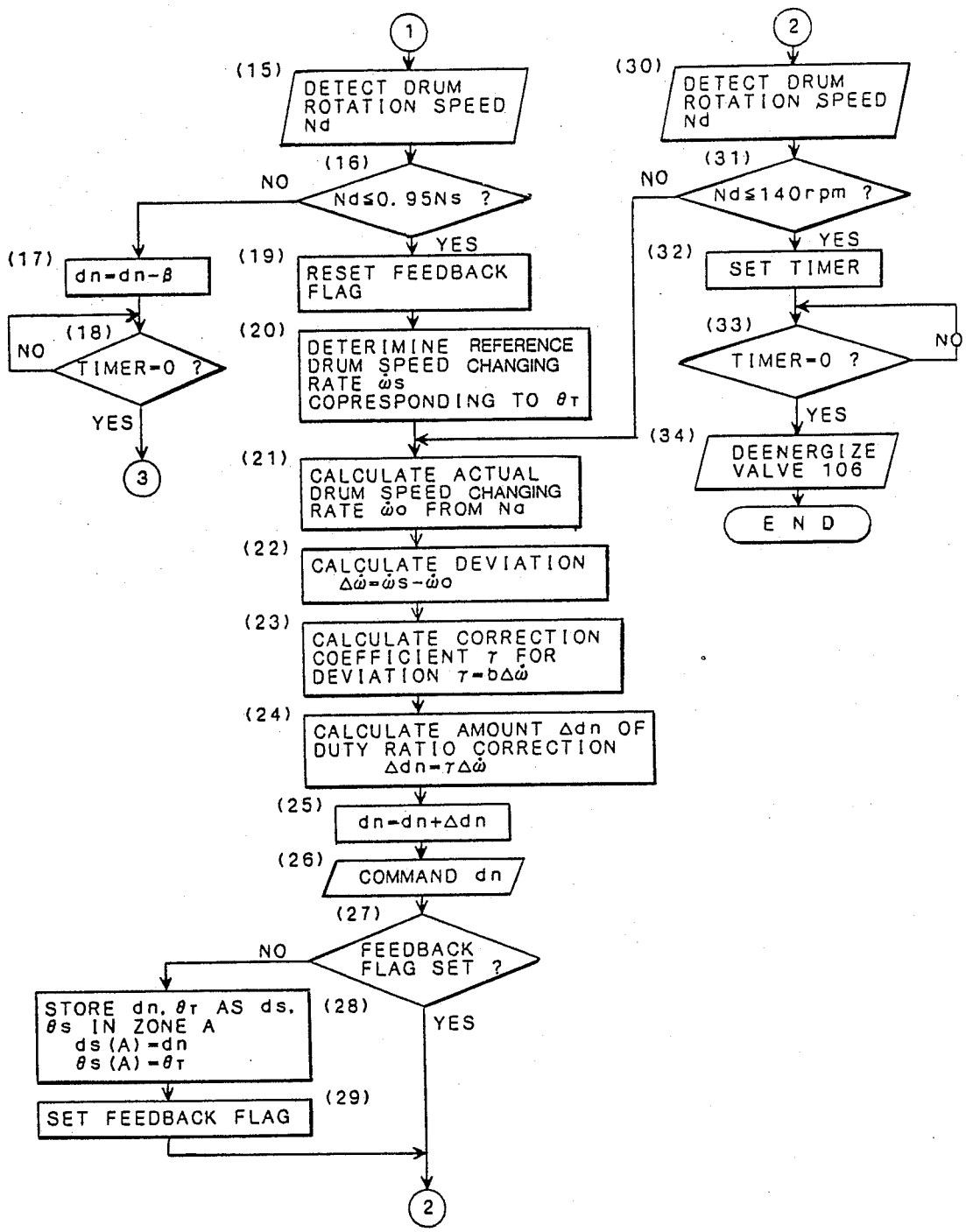
Figure 3:
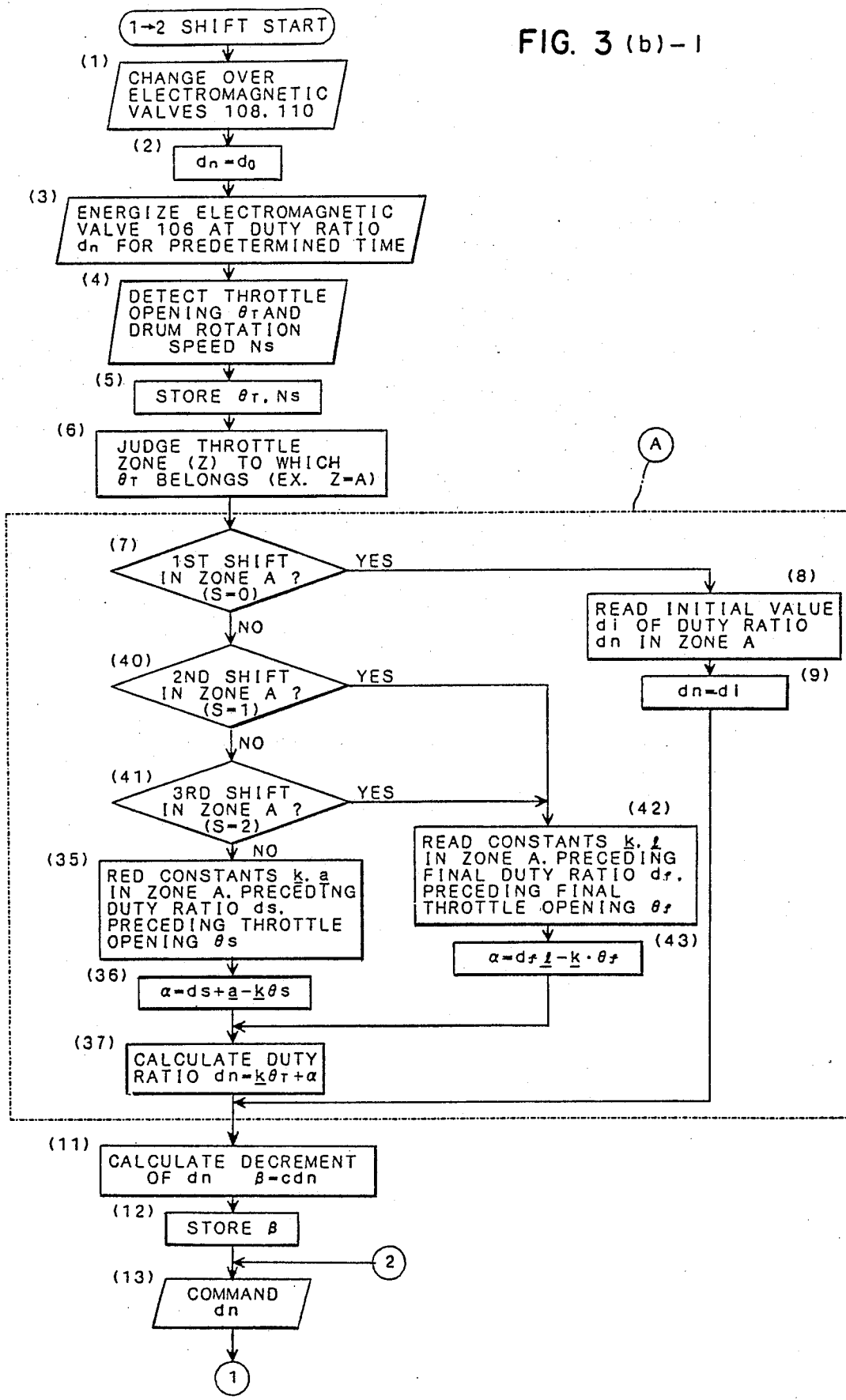
Figure 3:
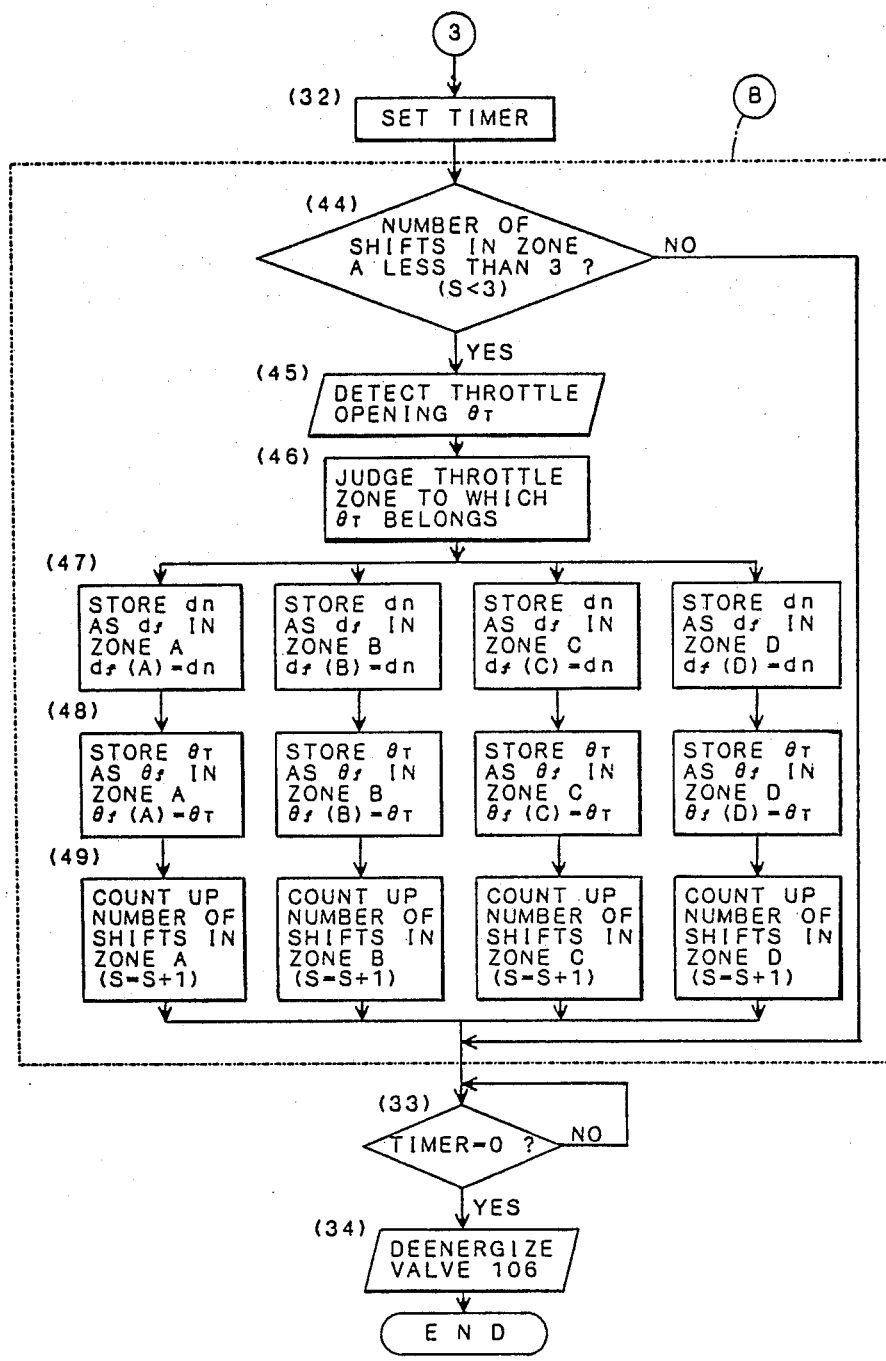

The electronic control device 112 is designed to operate according to a flow chart as shown in FIG. 3(a) or 3(b) so that, on the basis of the results of detection by the sensors described above, the initial hydraulic pressure to be supplied to the frictional engaging elements 24, 26, 28, 30, and 32 immediately after starting of a speed shift can be suitably set and the feedback control of the supplied hydraulic pressure can be carried out as described later.

Pressurized oil discharged from the oil pump 74 is supplied to the pressure regulating valve 82, the manual valve 88 and the pressure reducing valve 86 via a fluid passage 160.

The manual valve 88 has four positions, i.e., D, N, R and P positions. When the D position is selected, the fluid passage 160 communicates with fluid passages 172 and 174 so that the speed change gear assembly 22 can achieve the 1st to 4th forward speed ratios depending on the on-off combination of the electromagnetic valves 108 and 110 as shown in Table 2. At the N position, the fluid passage 160 communicates with the fluid passage 174 only, and the fluid passage 172 communicates with an oil outlet port 176, so that the neutral state is established in the speed change gear assembly 22. At the R position, the fluid passage 160 communicates with fluid passages 178 and 180 so that the rearward speed ratio can be established in the speed change gear assembly 22. At the P position, all the fluid passages communicating with the manual valve 88 communicate now with the oil outlet port 176 of 182 so that the speed change gear assembly 22 is placed substantially in a neutral state.

TABLE 2

| Speed ratio | Electromagnetic valve 108 | Electromagnetic valve 110 |
| --- | --- | --- |
| 1st | ON | ON |
| 2nd | OFF | ON |
| 3rd | OFF | OFF |
| 4th | ON | OFF |

The pressure regulating valve 82 includes a spool 188 having pressure receiving surfaces 184, 186, and a spring 188. When the hydraulic pressure supplied from the fluid passage 160 through the fluid passage 174 acts upon the pressure receiving surface 184, the hydraulic pressure in the fluid passage 160 is regulated to a predetermined constant value which will be referred to hereinafter as a line pressure. On the other hand, when the hydraulic pressure supplied from the fluid passage 160 through the fluid passage 178 acts upon the pressure receiving surface 186, the hydraulic pressure in the fluid passage 160 is regulated to another predetermined value.

The torque converter control valve 84 includes a spool 192 and a spring 194, and hydraulic pressure is supplied from the pressure regulating valve 82 via a fluid passage 196. By the balance between the hydraulic pressure acting on the right-hand pressure receiving surface of the spool 192 by flowing through a fluid passage 198 formed on the spool 192 and the biasing force of the spring 194, the hydraulic pressure is regulated to a predetermined value to be supplied to the torque converter 6 via a fluid passage 200. Oil discharged from the torque converter 6 is supplied through an oil cooler 202 to various lubricating parts of the speed change gear assembly 22.

The pressure reducing valve 86 includes a spool 204 and a spring 206. By the balance between the hydraulic pressure due to the area difference between opposing pressure receiving surfaces 208 and 210 formed on the spool 204 and the biasing force of the spring 206, the hydraulic pressure from the fluid passage 160 is reduced and regulated to a predetermined value to be supplied into a fluid passage 212. The regulated hydraulic pressure (reduced hydraulic pressure) is supplied from the fluid passage 212 to the N-R control valve 94, the hydraulic pressure control valve 96 and the orifice 114 of the electromagnetic valve 106 via an orifice 214.

The N-R control valve 94 includes a spool 222 formed with pressure receiving surfaces 216, 218, 220, and a spring 224. By the balance between the hydraulic pressure acting on the pressure receiving surface 216 and the combination of the hydraulic pressure due to the area difference between the pressure receiving surfaces 218, 220 and the biasing force of the spring 224, the hydraulic pressure in a fluid passage 226 is regulated to a predetermined value.

The hydraulic pressure control valve 96 includes a spool 234 formed with pressure receiving surfaces 228, 230, 232, and a spring 236. By the balance between the hydraulic pressure acting on the pressure receiving surface 228 and the combination of the hydraulic pressure due to the area difference between the pressure receiving surfaces 230, 232 and the biasing force of the spring 236, the hydraulic pressure in a fluid passage 238 is regulated to a predetermined value.

The hydraulic pressure thus regulated and supplied to the fluid passage 226 controls the low reverse brake 32 at the time of shifting to the reverse speed ratio. The hydraulic pressure regulated and supplied to the fluid passage 238 controls the front clutch 24, the rear clutch 26, the kickdown brake 30 and the low reverse brake 32 when the vehicle is in the forward driving condition or is halted.

The electromagnetic valve 106 is duty-controlled by the electronic control device 112. The ratio of opening and closure of the orifice 114 is changed by changing the proportion of the pulse width in one cycle of a constant-frequency pulse current (referred to hereinafter as a duty ratio) so as to control the value of the signal hydraulic pressure in a fluid passage 212 downstream of the orifice 214, that is, to control the hydraulic pressure acting on the pressure receiving surface 216 of the N-R control valve 94 and on the pressure receiving surface 228 of the hydraulic pressure control valve 96. Thus, by varying the signal hydraulic pressure, the value of the hydraulic pressure supplied to the individual frictional engaging elements is controlled. Therefore, the signal hydraulic pressure described above is regulated on the basis of the relation between the diameter of the orifice 214 and that of the orifice 114, and as a result, the regulated hydraulic pressure generated in the fluid passages 226 and 238 (the hydraulic pressure in the fluid passage 180 or 172) increases or decreases in a relation proportional to the increase or decrease in the signal hydraulic pressure.

However, the hydraulic pressure in the fluid passages 226 and 238 increases or decreases in a relation inversely proportional to the increase or decrease of the duty ratio.

The operation starting timing and operating duration of the electromagnetic valve 106 is determined by a control means such as that represented by the flow chart shown in FIG. 3(a) or 3(b) according to the electrical signals applied from the means such as the shift sensor incorporated in the electronic control device 112 for detecting the starting of a speed shift and applied from the engine load sensor 138 and various rotation speed sensors 140, 142 and 144.

The shift control valve 90 is controlled by the combination of the on-off states of the electromagnetic valves 108 and 110. The shift control valve 90 includes three spools 240, 242, 244 and two stoppers 246, 248. The spool 240 is formed with lands 250 and 252, an annular groove 254, and a fluid passage 258 through which the annular groove 254 communicates with a fluid chamber 256 on the left-hand side of the land 250. The spool 242 is formed with lands 260 and 262 of different diameters, an annular groove 264, and pressing portions 266 and 268 abuttable with the spools 240 and 244 respectively. The spoole 244 is formed with lands 270 and 272, an annular groove 274, and a fluid passage 278 through which the annular groove 274 communicates with a fluid chamber 276 on the right-hand side of the land 272. The stopper 246 is interposed between the spools 240 and 242 and is fixed to the casing. The stopper 248 is interposed between the spools 242 and 244 and is fixed to the casing. The fluid passage 172 communicates always with a fluid passage 280 through the annular groove 264. This fluid passage 280 communicates through an orifice 282 with the orifice 116, the left-hand fluid chamber 256 and the right-hand fluid chamber 276 and communicates also through an orifice 284 with the orifice 118 and a fluid chamber 286 defined between the spools 240 and 242.

The rear clutch control valve 92 includes a spool 294 formed with a land 288, another land 290 having a diameter smaller than that of the land 288, and an annular groove 292; a spool 306 formed with three lands 296, 298 and 300 having the same diameter as that of the land 290, and annular grooves 302 and 304; and a spring 308. When the pressing force of the hydraulic pressure introduced into a left-hand fluid chamber 310 in FIG. 2 to act on the pressure receiving surface of the land 288 exceeds the combination of the pressing force of the hydraulic pressure introduced into a right-hand fluid chamber 312 in FIG. 2 to act on the pressure receiving surface of the land 300 and the biasing force of the spring 308, the two spools 294 and 306 are urged to their rightmost positions in FIG. 2. When the spools 294 and 306 are brought to such positions, the hydraulic pressure acts between the lands 290 and 296, so that, when the hydraulic pressure in the fluid chamber 310 is then discharged, the spool 294 alone is urged leftward in FIG. 2. Thereafter, the spool 306 is urged leftward when the pressing force of the hydraulic pressure acting on the left-hand pressure receiving surface of the land 296 becomes smaller than the combination of the pressing force of the hydraulic pressure in the fluid chamber 312 and the biasing force of the spring 308.

The N-D control valve 98 includes a spool 320 formed with lands 314 and 316, and an annular groove 318, and a spring 322. Depending on the direction of the combination force of the hydraulic pressure acting on the pressure receiving surfaces 324, 326 and 328 and the biasing force of the spring 322, the spool 320 is selectively changed over between the leftmost position shown in FIG. 2 and the rightmost position (not shown).

The 1st-2nd speed shift valve 100 includes a spool 330 and a spring 332. Depending on whether or not the line pressure acts on a left-hand pressure receiving surface 334 of the spool 330, the spool 330 is changed over between the leftmost position shown in FIG. 2 and the rightmost position (not shown). Thus, when the line pressure is supplied to act on the pressure receiving surface 334, the spool 330 is urged to its rightmost position by the force of the line pressure, while, when the line pressure is exhausted, the spool 330 is urged to its leftmost position by the biasing force of the spring 332.

The 2nd-3rd and 4th-3rd speed shift valve 102 and the 4th speed clutch valve 104 similarly include spools 336 and 338, and springs 340 and 342, respectively. Fluid chambers 344 and 346 into which the line pressure is introduced are formed on the left-hand side of the spools 336 and 338 respectively, and fluid chambers 348 and 350 are formed on the right-hand side of the spools 336 and 338 respectively. In each of the valves 102 and 104, the spool is selectively changed over between the leftmost position shown in FIG. 2 and the rightmost position (not shown).

In the following description, hydraulic pressures supplied to a specific one of the frictional engaging elements in a starting stage and a terminating stage of a speed shift will be called an initial hydraulic pressure and a terminative hydraulic pressure respectively, and a hydraulic pressure supplied to the element in an initial stage of feedback control will be called an initial feedback-controlled hydraulic pressure.

Now, the operation of the automatic transmission having the aforementioned construction will be described together with how to set the initial hydraulic pressure during a speed shift according to the present invention. The manner of shift control in an automatic transmission having a construction similar to that described above is disclosed in detail in Ser. No. 421,311 filed Sept. 22, 1982 now U.S. Pat. No. 4,506,563, and the method of the present invention is similar in the manner of individual speed shifts. Therefore, a speed shift from the 1st speed ratio to the 2nd speed ratio will only be described by way of example, and other speed shifts will not be especially described herein.

In the state in which the 1st speed ratio is attained, both the electromagnetic valves 108 and 110 are in their energized state, and the line pressure supplied from the fluid passage 160 to the fluid passage 172 through the manual valve 88 is introduced into the fluid chamber of the rear clutch 26 through the hydraulic pressure control valve 96, a fluid passage 238, the N-D control valve 98, a fluid passage 352, the rear clutch control valve 92 and a fluid passage 354. On the other hand, the line pressure supplied from the branch of the fluid passage 238 is introduced into the fluid chamber of the low reverse brake 32 through the 1st-2nd speed shift valve 100 and a fluid passage 356. Therefore, both the rear clutch 26 and the low reverse brake 32 are now engaged.

When the accelerator pedal is further depressed in such a state to increase the speed of the vehicle, a shift starting signal generated from the electronic control device 112 is applied to the electromagnetic valves 108 and 110, with the result that the electromagnetic valve 108 is de-energized, while the electromagnetic valve 110 remains energized.

As a result, the spool 240 of the shift control valve 90 is moved together with the spool 242 rightward in FIG. 2 until the movement of the spool 240 is stopped by abutting on the stopper 246. The line pressure in the fluid passage 172 is introduced into a fluid passage 362 through the space between the two lands 260 and 262 of the spool 242, and the line pressure acts on the pressure receiving surface 334 of the 1st-2nd speed shift valve 100 to urge the spool 330 toward the rightmost position in FIG. 2. Consequently, the line pressure introduced into the 1st-2nd speed shift valve 100 via the fluid passage 238 is supplied to the engaging-side fluid chamber 366 of the kickdown brake 30 through a fluid passage 364. The rod 368 is urged leftward in FIG. 2 against the force of the spring 370 thereby causing engagement of the brake band (not shown) with the kickdown drum 52, while, the hydraulic pressure in a fluid passage 356 is exhausted through the fluid passage 226 to release the engagement of the low reverse brake 32 thereby achieving the speed shift to the 2nd speed ratio.

During the above speed shift from the 1st speed ratio to the 2nd speed ratio, the initial hydraulic pressure $P_1$ to be supplied to the kickdown brake 30 after the generation of the shift starting signal is set and the feedback control of the rate of supply of the hydraulic pressure to the kickdown brake 30 is made according to a flow chart programmed in the electronic control device 112. Such a flow chart is shown in FIG. 3(a) or 3(b).

The manner of control shown in the flow chart of FIG. 3(a) will be first described. Referring to FIG. 3(a), the electromagnetic valves 108 and 110 are changed over as described above when the shift starting signal is generated from the electronic control device 112 in the step (1). In the step (2), the duty ratio $d_n$ for the duty control of the electromagnetic valve 106 is set at a predetermined duty ratio $d_o$ (of, for example, 40.2%). In the step (3), the electromagnetic valve 106 is duty-controlled to operate with the duty ratio dn for a predetermined period of time (of, for example, 0.1 to 0.2 seconds), thereby regulating the signal hydraulic pressure downstream of the orifice 214 in the fluid passage 212. Thus, the hydraulic pressure supplied from the fluid passage 238 to the fluid chamber 366 of the kickdown brake 30 through the fluid passage 238, the 1st-2nd speed shift valve 100 and the fluid passage 364 is controlled. Such a fluid pressure control is required so that the piston of the kickdown brake 30 can be quickly moved from the initial position shown in FIG. 2 to a position where the brake band is ready to make engagement with the kickdown drum 52. That is, the length of time required for the so-called ineffective stroke of the piston is shortened to shorten the length of time required for the 1-2 speed shift.

Figure 4:
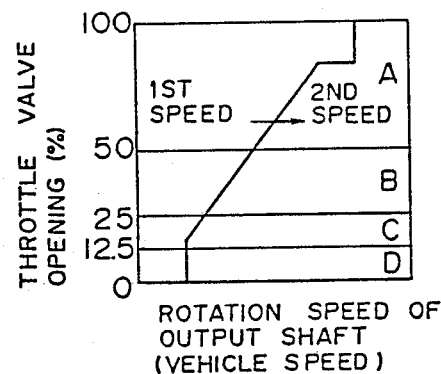
FIG. 4 is a diagram showing a plurality of zones of the throttle valve opening relative to the transmission shift pattern.

Then, in the steps (4) and (5), the opening $\theta_T$ of the throttle valve and the rotation speed Ns of the kickdown drum 52 are detected on the basis of the respective output signals of the sensors 138 and 142, and their data are stored in a memory of the electronic control device 112. In the step (6), judgment is made to find a zone of the throttle valve opening in which the detected throttle valve opening $\theta_T$ belongs. In the case of the embodiment of the present invention, the throttle valve opening is divided into four zones A, B, C and D as shown in FIG. 4, and, in the later description, it is supposed that the detected throttle valve opening $\theta_T$ belongs to the zone A shown in FIG. 4. The manner of control in the remaining zones is similar to that in the zone A except that different constants are set in those zones, and any detailed description of the manner of control in such other zones will not be especially made herein. It is apparent that the number of divided zones of the throttle valve opening and the widths of the individual zones should be suitably selected depending on, for example, the capacity of the engine.

Figure 5A:
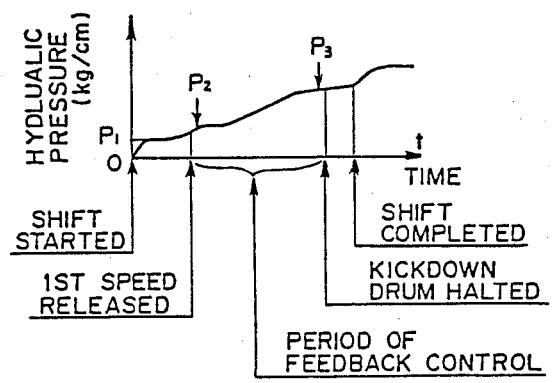
FIGS. 5(a), 5(b) and 5(c) are graphs showing the hydraulic pressure supplied to the kickdown brake, the rotation speed of the kickdown brake, and the torque of the output shaft, relative to the time required for shifting, respectively.
Figure 5C:
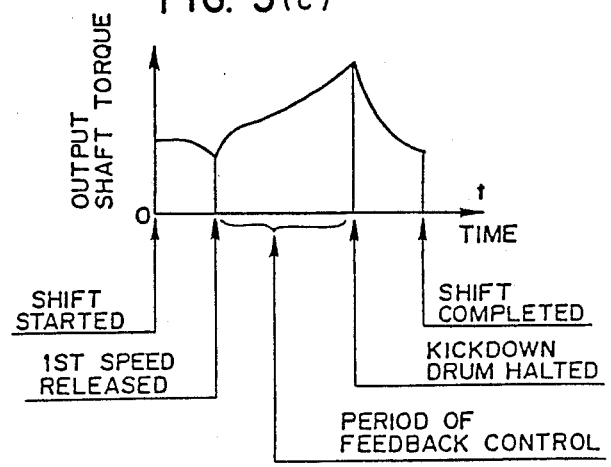

When the result of judgment in the step (6) proves that the detected throttle valve opening $\theta_T$ belongs to the zone A, judgment is made in the step (7) as to whether or not the 1-2 speed shift in the zone A is done for the first time after the vehicle was assembled. When the result of judgment in the step (7) proves that the 1-2 speed shift is done for the first time after assembling of the vehicle, an initial value di of the duty ratio dn corresponding to an initial hydraulic pressure $P_1$ (FIG. 5(a)) to be supplied during a first speed shift after assembling of the vehicle and stored previously in the memory of the electronic control device 112 is read out from the memory in the step (8). In the next step (9), the duty ratio dn is set to the value di (i.e. dn=di) and, in the step (10), a flag indicative of the fact that the first 1-2 speed shift has been made in the zone A is set in the memory. In the steps (11) and (12), a decrement $\beta = Cdn$ (per unit time) for decrementing the duty ratio dn, determined in the step (9), according to a predetermined gradient relative to time is calculated and stored in the memory. In the step (13), a command signal commanding the duty ratio dn determined in the step (9) is applied to the electromagnetic valve 106 to operate the electromagnetic valve 106 with the duty ratio dn(=di), so that the initial hydraulic pressure $P_1$ corresponding to the duty ratio dn(=di) can be supplied to the kickdown brake 30. As described already, the specific automatic transmission is not primarily adapted to meet the factor such as the displacement or the output torque of the engine. Therefore, the initial hydraulic pressure $P_1$ corresponding to the duty ratio di is not equal to a desired initial hydraulic pressure to be primarily supplied for attaining an ideal speed shift, and this initial hydraulic pressure $P_1$ is repeatedly corrected each time a 1-2 speed shift is done after the first 1-2 speed shift, until finally it equals the desired initial hydraulic pressure.

In the next step (14), a timer is actuated to make its timing operation. This timer provides the timing (a unit time) of subtracting, from the duty ratio dn, the decrement $\beta$ calculated in the step (11). In the step (15), the rotation speed Nd of the kickdown drum 52 is detected again, and, in the step (16), judgment is made as to whether or not the detected rotation speed Nd of the kickdown drum 52 becomes equal to or lower than 95% of the drum rotation speed Ns detected and stored in the memory in the step (5). That is, in this step (16), judgment is made as to whether or not the 1st speed ratio has been released. When the result of judgment in the step (16) is "No", that is, when it is judged that the 1st speed ratio has not yet been released, the result of subtraction of the decrement $\beta$ from the duty ratio dn currently set and commanded is employed as a new duty ratio dn in the step (17). After detecting the fact that the timer actuated in the step (14) displays now "0" in the step (18), the program returns to the step (13) in which the electromagnetic valve 106 is commanded to operate with the new duty ratio dn. Thereafter, the steps (13) to (18) are repeated until finally the result of judgment in the step (16) becomes "Yes", that is, until the release of the 1st speed ratio is judged. During this period of time, the duty ratio dn is decreased gradually along the predetermined gradient. (That is, the hydraulic pressure supplied to the kickdown brake 30 is gradually increased from the initial value P1 along the predetermined gradient.)

Figure 5B:
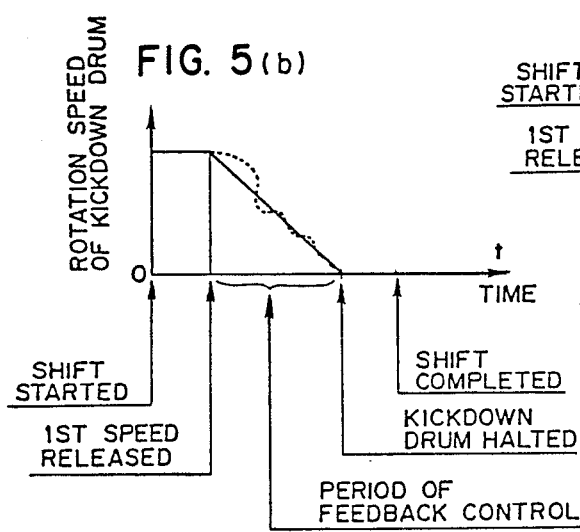

When, on the other hand, the result of judgment in the step (16) proves that the currently detected drum rotation speed Nd becomes equal to or lower than 95% of the initially-detected drum rotation speed Ns, a feedback flag for storing the fact that a first correction of the duty ratio dn in the course of feedback control to be executed according to the program has been done is reset in the step (19). In the step (20), a most suitable reference changing rate $\dot{\omega}_s$ of the kickdown drum 52 during the specific speed change is decided according to the throttle valve opening $\theta_T$ stored in the step (5). (Refer to the changing rate shown by the solid line in FIG. 5(b).) The most suitable reference changing rate $\dot{\omega}_s$ is selected among various reference changing rates previously set according to various throttle valve openings respectively. And, the reference changing rate is the changing rate of rotation speed of the kickdown drum 52 which is detected when the hydraulic pressure supplied to the fluid chamber 336 of the kickdown brake 30 increases at the optimum rate to avoid any engaging shock, any excessively large slip, etc. of the kickdownbrake 30. Then, in the step (21), the actual changing rate $\dot{\omega}_0$ of the rotation speed of the kickdown drum 52 is calculated on the basis of the rotation speed Nd of the kickdown drum 52 detected in the step (15), and, in the next step (22), the deviation $\Delta\dot{\omega}$ of the actual changing rate $\dot{\omega}_0$ from the reference changing rate $\dot{\omega}_s$ is calculated. In the step (23), the correction coefficient $\gamma = b\Delta\dot{\omega}$ (b:a constant) according to the deviation $\Delta\dot{\omega}$ is calculated, and, in the step (24), the deviation $\Delta\dot{\omega}$ is multiplied by the correction coefficient to calculate $\Delta dn = \gamma\Delta\dot{\omega}$ which provides the required amount of correction of the duty ratio dn. In the step (25), this correction amount $\Delta dn$ is added to the currently commanded duty ratio dn to employ the result of addition as a new duty ratio dn, and, in the step (26), a command signal commanding this new duty ratio dn is applied to the electromagnetic valve 106. As a result, the hydraulic pressure supplied to the kickdown brake 30 is regulated to minimize or cancel the deviation $\Delta\dot{\omega}$, and the actual changing rate of rotation speed of the kickdown drum 52, shown by the dotted curve in FIG. 5(b), is changed to follow up the desired change rate $\dot{\omega}_s$.

Therefore, by repeated execution of the above manner of feedback control, the hydraulic pressure supplied to the kickdown brake 30 is controlled to its optimum level to avoid any shift shock or any excessively large slip. In the manner described above, the correction coefficient $\gamma$ corresponding to the deviation $\Delta\dot{\omega}$ is calculated to be used for the correction of the duty ratio dn. Thus, the duty ratio dn can be corrected by an amount of correction $\Delta dn$ which is large relative to the deviation $\Delta\dot{\omega}$. That is, this amount of correction $\Delta dn$ is proportional to the second power of the deviation $\Delta\dot{\omega}$. Therefore, even when the deviation $\Delta\dot{\omega}$ is considerably large, the changing rate of rotation speed of the kickdown drum 52 can quickly follow up the reference changing rate $\dot{\omega}_s$. Depending on the situation, the coefficient $\gamma$ may be selected so that the amount of correction $\Delta dn$ is equal to or more than the third power of the deviation $\Delta\dot{\omega}$ or may be so selected that the amount of correction $\Delta dn$ is merely a multiple of the deviation $\Delta\dot{\omega}$.

After commanding of the new duty ratio dn in the step (26), judgment is made in the step (27) as to whether or not the feedback flag is set so as to judge as to whether or not the duty ratio dn is to be corrected for the first time by execution of the feedback control. When the result of judgment in the step (27) is "No", that is, when the duty ratio dn is to be corrected by first execution of the feedback control to be repeatedly executed, the new duty ratio dn(=$\Delta dn+dn$), set in the step (25), which corresponds to an initial feedback-controlled hydraulic pressure P2 (FIG. 5(a)) to be supplied to the kickdown brake 30, is stored in the memory as a preceding duty ratio ds, and the data of the throttle valve opening $\theta_T$ stored in the memory in the step (5) is employed as a preceding throttle valve opening $\theta_s$, so that these data can be used for the calculation of the duty ratio dn corresponding to the initial hydraulic pressure P1 to be supplied in a succeeding 1-2 speed shift within zone A (that is, a second 1-2 speed shift after assembling of the vehicle). Then, in the step (29), a feedback flag is set. In the step (30), the rotation speed Nd of the kickdown drum 52 is detected again. Then, in the step (31), judgment is made as to whether or not the detected rotation speed Nd of the kickdown drum 52 is equal to or lower than a predetermined value, (for example, 140 rpm) so as to judge as to whether or not the speed shift is about to be completed. Thereafter, the feedback control including the steps (21) to (27), (30) and (31) is repeatedly executed until the detected rotation speed Nd of the kickdown drum 52 is judged to be equal to or lower than the predetermined value in the step (31). In the second and succeeding feedback control, the feedback flag is necessarily set in the step (29), and the result of judgment in the step (27) is "Yes". Therefore, the steps (28) and (29) are not repeatedly executed. The duty ratio corresponding to the initial feedback-controlled hydraulic pressure P2 to be supplied in the initial stage of the feedback control is not limited to that employed in the first feedback control and may be that employed in the second or later feedback control, provided that is lies within the range employed initially in the feedback control.

When the result of judgment in the step (31) proves that the detected drum rotation speed Nd is equal to or lower than the predetermined value and, thus, indicates that the speed shift is in its final stage, a predetermined length of time (of, for example, 0.1 sec) is set by the timer in the step (32). Until the timer decrement to "0" in the step (33), the duty ratio dn set in the final stage of the feedback control is maintained so as to complete the speed shift. Then, in the step (34), de-energization of the electromagnetic valve 106 is commanded to terminate the speed shift.

Description will then be directed to the case where a second 1-2 speed shift in the zone A is carried out after assembling of the vehicle. In the case, the step (10) in the first speed shift described above has been executed already, and the result of judgment in the step (7) is "No". The memory stores therein the data of the duty ratio ds and throttle valve opening $\theta s$ detected in the preceding speed shift in the zone A, together with constants k and a experimentally determined for each of the individual zones A to D shown in FIG. 4 respectively. In the step (35), the data of the preceding duty ratio ds and the preceding throttle valve opening $\theta s$ in the zone A are read out from the memory together with the constants k and a in the zone A. Then, in the step (36), on the basis of the values of ds, $\theta s$, k and a read out from the memory, a correction factor $\alpha$ for determining the duty ratio dn corresponding to the initial hydraulic pressure $P_1$ to be supplied in the current speed shift is calculated according to a calculating formula $\alpha = ds + a - k \cdot \theta s$. Then, in the step (37), on the basis of the calculated correction factor $\alpha$, the constant k and the throttle valve opening $\theta_T$ detected in the step (4) during the current speed shift, the duty ratio dn corresponding to the initial hydraulic pressure $P_1$ to be supplied in the current speed shift is calculated according to a calculating formula $dn = k \cdot \theta_T + \alpha$, and the program shifts to the step (11). Steps executed after the step (11) are similar to those executed in the first speed shift.

Thus, the duty ratio dn corresponding to the initial hydraulic pressure $P_1$ to be supplied in this second speed shift is determined on the basis of the duty ratio ds corresponding to the hydraulic pressure $P_2$ made closer to the desired value by the feedback control in the preceding 1-2 speed shift. Therefore, the duty ratio dn approaches gradually to the value meeting the capacity of the engine 2 although the capacity of the automatic transmission does not primarily meet the capacity of the engine 2.

Thereafter, a third speed shift and succeeding ones are repeated in the manner described above, so that the initial hydraulic pressure $P_1$ supplied to the kickdown brake 30 immediately after starting of the individual speed shifts is gradually regulated until finally it approximates to or coincides with the initial hydraulic pressure $P_1$ optimum for the capacity of the specific engine 2.

Thus, until the initial hydraulic pressure $P_1$ supplied for attaining the speed shift approximates to or coincides with the appropriate value, the duty ratio corresponding to the initial feedback-controlled hydraulic pressure $P_2$ supplied in the initial stage of the feedback control of a speed shift is based to calculate the initial hydraulic pressure $P_1$ to be supplied in a succeeding speed shift. Therefore, this initial hydraulic pressure $P_1$ can be finally controlled to coincide with or equal the appropriate valve with very high accuracy.

In a plurality of engines having respectively different capacities, the characteristic of change of the output torque relative to the characteristic of change of the rotation speed during a speed shift in one of the engines differs from or is not analogous to that of another. Therefore, when the initial hydraulic pressure to be supplied to the clutch or brake in a second speed shift is corrected by calculation on the basis of the hydraulic pressure supplied to the clutch or brake during a first speed shift (expecially in the final stage of the speed shift), the same corrective calculating formula cannot be applied to all the automatic transmissions to be combined with a plurality of engines of different capacities. This is because, in some or most of the engines, an error of a certain extent occurs inevitably between the initial hydraulic pressure corrected by calculation for a speed shift in a specific engine and the initial hydraulic pressure appropriate for the capacity of the specific engine combined with the automatic transmission to which the correction by calculation is applied.

However, the amount of change of the output torque is small in the initial stage of the feedback control since the amount of change of the rotation speed of the engine in the starting stage of the speed shift is small. Therefore, even in the case of engines having generally different characteristics of change of the output torque, the characteristic of change of the output torque in the short period of time (or from the starting of the speed shift to the initial stage of the feedback control) in one engine can be regarded to be substantially similar to that in another engine. Therefore, even when the same calculating formula is applied to automatic transmissions combined in common with a plurality of engines of different capacities, the initial hydraulic pressure $P_1$ can be corrected with very high accuracy to coincide with the initial hydraulic pressure optimum for the capacity of each of the individual engines. Further, since there is only a slight difference between the initial hydraulic pressure $P_1$ supplied in the starting stage of a speed shift and the initial feedback-controlled hydraulic pressure $P_2$ supplied in the initial stage of the feedback control, the required amount of correction of the initial hydraulic pressure to be supplied for the next and succeeding speed shifts is relatively small, thereby enhancing the effect of convergence of the initial hydraulic pressure to its appropriate value.

Another embodiment of the method according to the present invention will be described with reference to a flow chart shown in FIG. 3(b). The flow chart shown in FIG. 3(b) is a modification of that shown in FIG. 3(a), and the characteristic parts Ⓐ and Ⓑ different from FIG. 3(a) will only be described in detail with reference to FIG. 3(b).

The embodiment shown in FIG. 3(b) is featured in that in order to promote the rate of convergence of the initial hydraulic pressure toward its optimum value, the initial hydraulic pressure to be supplied for first several 1-2 speed shifts after assembling of the vehicle is determined or calculated on the basis of the terminative hydraulic pressure supplied in the final stage of the preceding speed shift. For this purpose, the manner of calculation of the duty ratio dn corresponding to the initial hydraulic pressure $P_1$ supplied for the speed shift is altered depending on the number of times of speed shift in the part Ⓐ of FIG. 3(b), and the duty ratio corresponding to the terminative hydraulic pressure $P_3$ (shown in FIG. 5(a)) supplied in the final stage of each of the speed shifts is stored in the memory in the part Ⓑ of FIG. 3(b).

In the steps (7), (40) and (41) in the part A, judgment is made as to whether the 1-2 speed shift in the zone A has been done once, two times, three times or more after assembling of the vehicle by reading the count S of an up counter. When the result of judgment proves that the current speed shift is the first, the steps (8), (9) and (11) are excuted, and if the current speed shift is the fourth or subsequent, the steps (35), (36), (37) and (11) are executed, as in the case of the flow chart described with reference to FIG. 3(a). On the other hand, when the result of judgment proves that the current speed shift in the zone A is the second or the third, the duty ratio df corresponding to the terminative hydraulic pressure $P_3$ in the preceding speed shift in the zone A and the throttle valve opening $\theta f$ (described later) detected in the final stage of the preceding speed shift are read out from the memory in the step (42) together with required ones of constants k and l experimentally determined for each of the individual zones A to D. (In this case, the constant k is the same as that read out in the step (35). Then, in the step (43), the correction factor $\alpha$ for calculating the duty ratio dn corresponding to the initial hydraulic pressure $P_1$ to be supplied for the current speed shift on the basis of the valves of df, $\theta f$, k and l read out from the memory is calculated according to a calculating formula $\alpha = df \cdot l - k \cdot \theta f$. In the step (37), on the basis of the calculated correction factor $\alpha$, the duty ratio dn corresponding to the initial hydraulic pressure $P_1$ is calculated according to the calculating formula $dn = k \cdot \theta_T + \alpha$.

The steps in the part Ⓑ of FIG. 3(b) will then be described.

When the detected rotation speed Nd of the kickdown drum 52 is judged to be equal to or lower than the predetermined value (of 140 $\gamma$pm) in the step (31) during the feedback control, the timer is actuated in the step (32). Then, in the step (44), the number of times of speed shift in the zone A is judged on the basis of the count s. When the result of judgment proves that the number of times of speed shift is three or more, the step (33) is followed and the speed shift is terminated.

When, on the other hand, the result of judgment in the step (44) proves that the current speed shift in the zone A is the first or the second, the throttle valve opening $\theta_T$ at that time, that is, in the final stage of the first or second speed shift is detected in the step (45). Then, in the step (46), judgment is made to detect one of the zones A to D in FIG. 4 to which the detected throttle valve opening $\theta_T$ belongs. This judgment is necessary because the throttle valve opening may belong to a zone different from that to which the throttle valve opening has initially belonged at the starting time of a speed shift as a result of its change in the course of the speed shift. Thus, when the throttle valve opening detected in the final stage of the first or second speed shift belongs to a zone other than the zone A although the speed shift has started in the zone A, the terminative hydraulic pressure $P_3$ in the specific speed shift has a value appropriate for the other zone but not appropriate for the zone A, and the calculated initial hydraulic pressure $P_1$ based on the terminative hydraulic pressure $P_3$ appropriate for the other zone to be supplied at the starting time of the next speed shift in the zone A does not provide an appropriate value.

When the result of judgment in the step (46) proves that the throttle valve opening $\theta_T$ detected in the final stage of the current speed shift belongs to, for example, the zone B, the duty ratio dn set in the step (25) during the last feedback control is stored in the step (47) in the memory as a final duty ratio df corresponding to the terminative hydraulic pressure $P_3$ supplied in the preceding speed shift, and this data df is used for calculating the duty ratio corresponding to the initial hydraulic pressure $P_1$ to be supplied at the starting time of the next 1-2 speed shift in the zone B. In the step (48), the throttle valve opening $\theta_T$ detected in the step (45) is stored in the memory as the final throttle valve opening $\theta f$ in the preceding speed shift in the zone B, and, in the step (49), the count S indicating the number of times of speed shift in the zone B is incremented to $S = S + 1$. Then, the step (33) is followed, and the speed shift is terminated. Thus, when a 1-2 speed shift is done later under the condition in which the throttle valve opening $\theta_T$ at the starting time of that speed shift belongs to the zone B, the result of judgment in the step (7) is "No" even if such a 1-2 speed shift is actually done for the first time after assembling of the vehicle. Then, the result of judgment in the step (40) is "Yes", so that a corrected initial hydraulic pressure $P_1$ based on the terminstive hydraulic pressure $P_3$ can be supplied.

The final duty ratio df (hence, the terminative hydraulic pressure $P_3$) may be either the duty ratio dn employed before termination of the feedback control or the duty ratio dn employed at the terminating time of the feedback control. In effect, the duty ratio df is preferably the duty ratio dn employed at the time at which the changing rate of rotation speed of the kickdown drum 52 approximates to or coincides with the desired change rate.

In will be seen from the above description of the flow chart of FIG. 3(b) that, when the number of times of the same speed shift (for example, the 1-2 speed shift) in one of the zones A, B, C and D after assembling of the vehicle is less than a predetermined value, the duty ratio corresponding to the initial hydraulic pressure $P_1$ to be supplied in the current speed shift is calculated or determined on the basis of the duty ratio df corresponding to the terminative hydraulic pressure $P_3$ and the final throttle valve opening $\theta f$ in the preceding same speed shift. It will also be seen that, when, on the other hand, the number of times of the same speed shift in that zone is more than the predetermined value, the duty ratio corresponding to the initial hydraulic pressure $P_1$ to be supplied in the current speed shift is calculated or determined on the basis of the duty ratio corresponding to the initial feedback-controlled hydraulic pressure $P_2$ supplied in the initial stage of the feedback control and the throttle valve opening employed in the preceding same speed shift.

As a result of the feedback control, the hydraulic pressure supplied in the final stage of a speed shift is regulated to an appropriate value or a value close thereto. Therefore, when the initial hydraulic pressure $P_1$ to be supplied at the starting time of the next speed shift is calculated on the basis of the terminative hydraulic pressure $P_3$, the initial hydraulic pressure $P_1$ can be quickly approximated to the appropriate value. However, when a common calculating formula is employed for that purpose, hunting or like trouble resulting in difficulty of accurate convergence of the initial hydraulic pressure $P_1$ to its appropriate value occurs due to the aforementioned difference of the output torque characteristics attributable to different capacities of engines. (In this case, the value of change of the output torque developed from the starting time of a speed shift to the detecting time of the terminative hydraulic pressure $P_3$ in one engine differs greatly from that in another engine. Therefore, the torque characteristic of the individual engines cannot be regarded to be substantially similar.) On the other hand, when the initial feedback-controlled hydraulic pressure $P_2$ supplied in the initial stage of feedback control is based to calculate the initial hydraulic pressure $P_1$ to be supplied at the starting time of a speed shift, this initial hydraulic pressure $P_1$ can be converged to its appropriate value with high accuracy as described above. However, when this method only is resorted to, the speed shift must be done many times for attaing the desired convergence of the initial hydraulic pressure $P_1$ to its appropriate value. Since, the value of the initial hydraulic pressure $P_1$ (hence, the duty ratio di) stored in the memory before execution of the speed shift deviates considerably from its appropriate value, the value of the initial feedback-controlled hydraulic pressure $P_2$ also deviates considerably from its appropriate value, and the amount of correction per feedback control is considerably small.

Thus, according to the flow chart shown in FIG. 3(b), the advantageous portions of the two methods described above are selectively utilized so that the initial hydraulic pressure $P_1$ to be supplied at the starting time of a current speed shift can be converged to its appropriate value with high accuracy and with a minimum number of speed shifts, that is, with a maximum efficiency of convergence.

The number of times of execution of the program for calculating the initial hydraulic pressure $P_1$ on the basis of the terminative hydraulic pressure $P_3$ after assembling of the vehicle is not limited to that described in the embodiments of the present invention and may be suitably selected.

It will be apparent from the foregoing detailed description of the present invention that in an automatic transmission for a vehicle having a feedback control function for supplying an appropriate hydraulic pressure to a frictional engaging element during a speed shift, an initial hydraulic pressure to be supplied to the frictional engaging element in a succeeding speed shift is determined on the basis of the hydraulic pressure supplied to the frictional engaging element in a preceding speed shift. Therefore, an automatic transmission which is not primarily adapted to be combined with an engine from the aspect of capacity can be automatically adapted to satisfactorily operate with the engine, thereby realizing the desired application of the automatic transmission of single capacity to any one of engines of various capacities, and at the same time, reducing the production costs and simplifying the production control.

Further, since an initial hydraulic pressure to be supplied at the starting time of a speed shift is calculated on the basis of an initial feedback-controlled hydraulic pressure supplied in the initial stage of feedback control, this initial hydraulic pressure can be converged to its appropriate value with high accuracy. Furthermore, a terminative hydraulic pressure supplied for terminating a speed shift and an initial feedback-controlled hydraulic pressure are suitably selected depending on the number of times of speed shift done after assembling of the vehicle, so that the initial hydraulic pressure to be supplied in a current speed shift can be calculated on the basis of either of the hydraulic pressures. Therefore, the initial hydraulic pressure can be converged to its appropriate value rapidly with accuracy.

We claim:

1. In a method for feedback controlling a vehicular automatic transmission, in which hydraulic pressure is supplied to a frictional engaging element which engages a rotatable element of a planetary gear set in order to change the actual rotation rate of said rotatable element to converge with a predetermined reference value during a shift from one speed ratio to another, the improvement which comprises setting the hydraulic pressure during the initial stage of gear shifting by;

reading, from a memory, data representing a first operating condition of the vehicle at a time immediately after the start of the feedback controlling during a preceding shift, and data representing a first hydraulic pressure supplied to said frictional engaging element at that time;

determining a second hydraulic pressure to be supplied to said frictional engaging element immediately before the start of feedback control of a current shift, according to said first operating condition and said first hydraulic pressure;

executing said feedback control;

replacing, in said memory, said data representing said first operating condition and said first hydraulic pressure with data representing a second operating condition of said vehicle during the initial stage of said feedback control and a second hydraulic pressure supplied to said frictional engaging element at that time.

2. The method of claim 1 wherein said data representing said first and second operating conditions are determined from the opening of a throttle valve disposed in an engine intake system.

3. The method of claim 2 wherein said opening of the throttle valve is divided into a plurality of zones, and the value of said second hydraulic pressure is determined for each of said zones.

4. The method of claim 1 wherein, in each of a predetermined number of earlier shifts, data representing the operating condition of the vehicle immediately before the end of the feedback control during the preceding shift is read out from said memory as the data representing said first operating condition of the vehicle, and data representing the hydraulic pressure supplied to said frictional engaging element at that time is read out from said memory as the data representing said first hydraulic pressure.

5. The method of claim 4 comprising determining the data representing said operating conditions of the vehicle from the opening of a throttle valve disposed in an engine intake system.

6. The method of claim 5 wherein said opening of the throttle valve is divided into a plurality of zones, and the value of said second hydraulic pressure is determined for each of said zones.

* * * * *